No. 805,568. PATENTED NOV. 28, 1905.
H. R. LOCKHART.
TROLLEY BASE.
APPLICATION FILED JULY 23, 1904.

Witnesses

Inventor
Henry Roland Lockhart
By
Attorney

UNITED STATES PATENT OFFICE.

HENRY ROLAND LOCKHART, OF WESTMOUNT, CANADA.

TROLLEY-BASE.

No. 805,568.      Specification of Letters Patent.      Patented Nov. 28, 1905.

Application filed July 23, 1904. Serial No. 217,816.

*To all whom it may concern:*

Be it known that I, HENRY ROLAND LOCKHART, a citizen of the United States, residing at 111 Lewis avenue, in the town of Westmount, in the Province of Quebec, Dominion of Canada, have invented a certain new and useful Improvement in Trolley-Bases, of which the following is a specification.

My invention relates to electric railways operated through a trolley; and it has for its object to provide a base supporting the trolley-pole adapted to permit movement in every direction and more particularly to permit the trolley-pole to swing on a bearing parallel to the roof of the car lengthwise, thereby providing a mechanism which holds the trolley-wheel securely to the trolley-wire in all positions of the car and which prevents wear and tear on both trolley-wheel and trolley-wire, due to pressures on curves in the railway-line.

Reference is made to the annexed drawings, in which—

Figure 1:
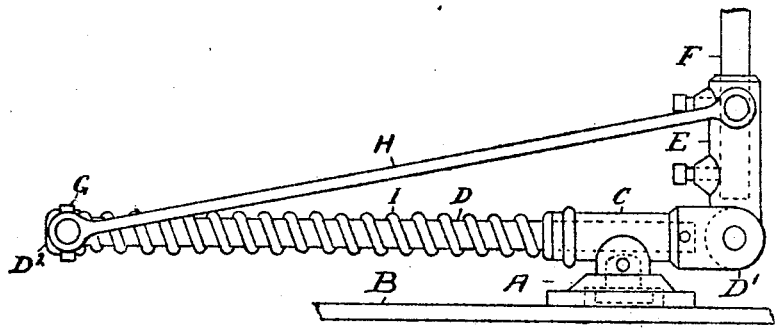
Figure 2:
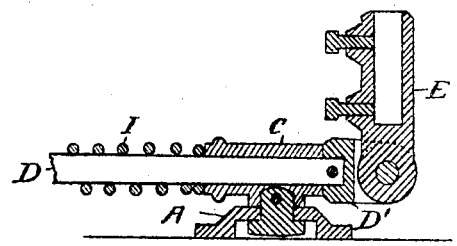
Figure 3:
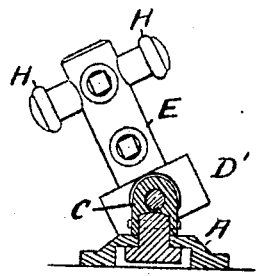

Figure 1 is the side view of the trolley-base. Fig. 2 is a vertical section of Fig. 1, and Fig. 3 is a vertical cross-section of Fig. 1.

The mechanism as shown consists of the socket A, secured to the car-roof B, and vertically pivoted in the socket A is the horizontal bearing C. Through the bearing C a rod D passes, provided with a fork D' at one end and the nut $D^2$ at the other end. A yoke E, into which the trolley-pole F is secured, is journaled to the fork D'. A sliding cross-head G travels on the bar D. A pair of rods H connect the yoke E with the cross-head G, and a coil-spring I surrounds the rod D between the cross-head G and the bearing C. With this construction the trolley-pole F can swing in a vertical plane on a bearing in the yoke D' and with the rod D can swing sidewise in the bearing C, which bearing C itself can turn in the socket A, thus providing for the trolley-pole F a universal bearing or joint upon the roof of the car B.

I am aware that the trolley-bases hitherto used and known have been provided with a vertical bearing and a horizontal bearing in combination; but my invention provides for an extension of the movement of the trolley-pole by the addition of a second horizontal bearing at right angles to the bearing of the trolley-pole.

I do not limit my invention to the specific form of construction shown in the drawings, which disclose one form of the universal-joint support.

Having now described my invention, what I claim, and desire to secure by Letters Patent, is—

1. In a trolley-base, the combination of a trolley-pole socket, a bar, a bearing vertically pivoted in the car-roof in which the said bar is horizontally journaled, and pivotal connections between the socket and the bar at right angles to the bearing as described.

2. In a trolley-base, the combination of a trolley-pole socket, a bar, a bearing vertically pivoted in the car-roof in which the said bar is horizontally journaled, pivotal connections between the socket and the bar at right angles to the bearing, and a tension device connecting the socket and the bar as described.

3. A trolley-base comprising a socket secured to the car-roof, a horizontal bearing vertically pivoted in the socket, a tension-spring-carrying bar journaled in the horizontal bearing and a trolley-pole yoke horizontally pivoted to the bar at right angles to the vertically-pivoted bearing as described.

4. A trolley-base comprising a socket secured to the car-roof, a horizontal bearing vertically pivoted in the socket, a tension-spring-carrying bar journaled in the horizontal bearing, a trolley-pole yoke horizontally pivoted to the bar at right angles to the vertically-pivoted bearing, a cross-head sliding on said bar and linked to the trolley-pole yoke, and a tension-spring surrounding said bar between the cross-head and the vertically-pivoted horizontal bearing as described.

In testimony whereof I have signed my name to this specification in the presence of two subscribing witnesses.

HENRY ROLAND LOCKHART.

Witnesses:
    I. A. DAWSON,
    HANBURY A. BUDDEN.